Patented Aug. 28, 1934

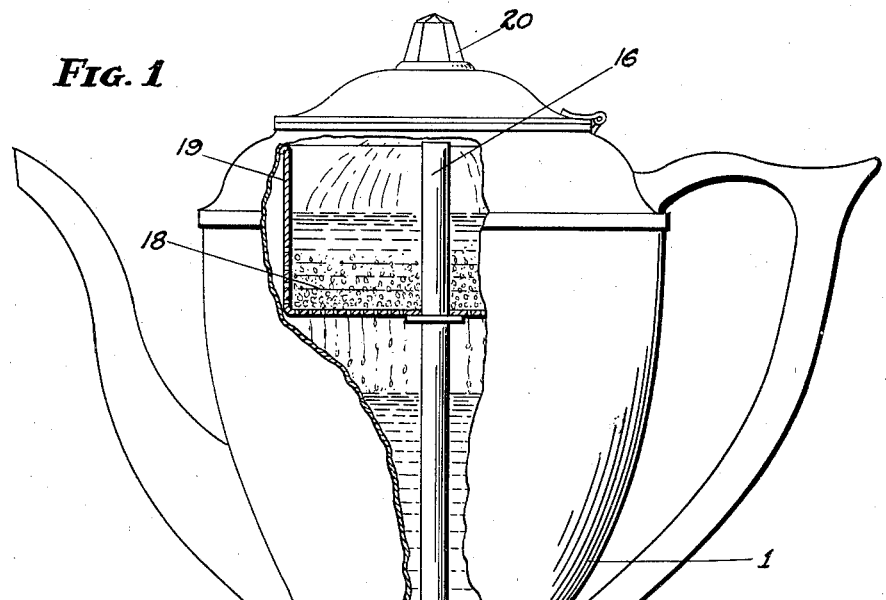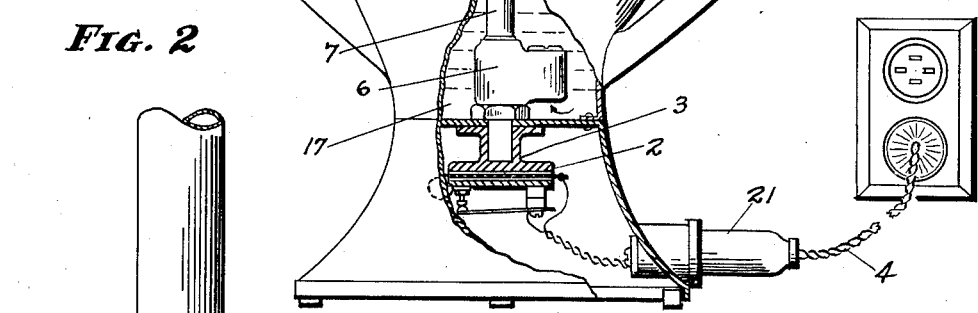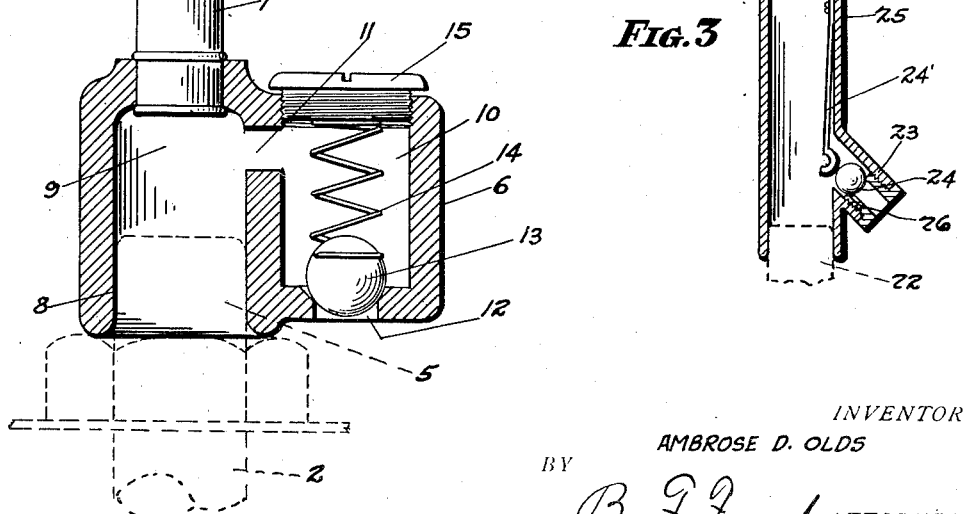

1,971,758

UNITED STATES PATENT OFFICE 1,971,758

COFFEE MAKER

Ambrose D. Olds, Wichita, Kans.

Application January 15, 1932, Serial No. 586,750

16 Claims. (Cl. 53—3)

This invention relates to thermal pumps of the type comprising a tube having an inlet at one end and a discharge above it, the lift of the liquid being due to thermal pressure at the inlet of the tube. This type of pump is susceptible of different uses but it particularly lends itself for use in connection with coffee making devices so for the purpose of illustration I have shown it applied to a coffee maker. It is to be understood however that insofar as the pump alone is concerned, I do not want to be limited to any particular use.

In order to fully appreciate the advantages of my invention it should be remembered that the ordinary thermal pump will continue to operate so long as there is sufficient liquid to feed it and heat enough to lift the liquid in the tube, but no provision has heretofore been made to prevent the effective operation of the pump when the temperature of the liquid at the inlet end has reached a predetermined value. In certain applications of such a pump it is desirable to do this so I have provided means whereby the pump may function in the usual way until there is a predetermined temperature rise in the liquid whereupon the pump for all practical purposes will cease to function.

The coffee bean contains two main groups of constituents, those desirable aromatic elements essential to the production of a satisfactory beverage and those deleterious elements (sometimes called tannic acid) which detract from the beverage.

The first group is liberated by the water at a temperature below the boiling point while the second group (tannic acid) will not be liberated to any objectionable extent until the water or liquid reaches or nearly reaches the boiling point, so in order to produce the most efficacious beverage the coffee water should be flowed over the ground coffee slightly below the boiling point, generally not above 200 degrees Fahrenheit. My invention will substantially cut off the flow of the liquid before the boiling point is reached so that very little of any of the objectionable constituents of the ground coffee will be liberated in the brew.

The construction of the invention will be best understood by reference to the following description in connection with the accompanying drawing in which Figure 1 is an elevational view of a coffee maker constructed in accordance with my invention, parts being broken away to better illustrate certain other parts.

Figure 2 is a sectional view through the inlet end of the pump, the tube and valve, and Figure 3 is a sectional view through a modified form of my invention, being shown in elevation.

The liquid receptacle 1 may be of any preferred construction. It is shown with a well 2 surround by an electrical heating element 3 supplied with electric current from a commercial line by means of the electric cord 4 in the usual manner. The well has an upstanding neck 5 over which fits the hollow inlet base 6 of the pump. The pump tube 7 is carried by the hollow base 6 and it is shown in line with the opening 8 which receives the neck 5 of the well.

The hollow base 6 is divided into two chambers. The chamber 9 communicates the well with the tube 7 and it is also in communication with the inlet chamber 10 through the port 11. The offset inlet chamber 10 has an inlet opening 12 provided with an inwardly opening check valve 13, which may or may not be urged on its seat by the spring 14, the tension of which can be varied by the screw plug 15 threaded into the casting. The discharge end 16 delivers the liquid from the space 17 in the container 1 over the coffee 18 in the basket 19 in the usual manner.

Inasmuch as it is desirable that the water flow over the coffee a sufficient length of time to liberate practically all the desirable elements contained in the coffee in the basket 19, I have provided a balance between the heat supplied to the well and the quantity of water circulated over the coffee. For example, in a six-cup coffee maker the heater is so designed that it will require about 18 minutes to raise the temperature of the water from about 60 degrees Fahrenheit to 205 degrees Fahrenheit. When the parts are assembled the hydrostatic pressure of the liquid in the container will preponderate over the pressure in the chambers 9 and 10 so the valve 13 will lift to permit the flow of liquid into the well and into the tube 7. The heater 3 will raise the temperature of the liquid in the well high enough to create pressure sufficient to force the cooler liquid up through the tube to discharge into the dripper in the same manner as the ordinary valve type pump operates. This action continues until the pressure in chambers 9 and 10 plus the weight of the ball check valve preponderate over the hydrostatic pressure in the container. When this happens the valve 13 will be held on its seat so that the supply to the pump will be retarded to a sufficient degree to cause the pumping action to cease.

The top of the container is provided with a transparent cap 20 so that the discharge end of the tube 7 can be observed. When the operator notices that the pump has stopped operating the plug 21 should be disconnected so that the coffee brew in the container will not boil as it might do if the plug was left connected for too long a time after the pump ceased to operate.

From the foregoing it will be apparent that the temperature of the liquid contacting with the ground coffee in basket 19 and the time that the pump is operating can be definitely controlled so that very little if any of the deleterious constituents of the ground coffee bean will be liberated in the brew.

In Figure 3, I have shown a modified form of my invention in which the tube 21 is provided with an inlet 22 from the well and a branch feed inlet 23 above it. In the branch 23 is an inwardly opening check valve 24 normally limited on its inward movement by the thermostat blade 24' having its end 25 fast to the tube and its lower end in line with the branch 23. When the temperature of the liquid reaches a predetermined value, the thermostatic blade will force the valve on its seat 26 so the liquid from the container will cease to flow into the tube so the pumping action will stop.

The tube 7 and the tube 25 fit over the neck 5 to seal off direct communication between the container and the well to prevent leakage between the container and the well.

What I claim is:

1. A thermal pump comprising an upstanding tube having an inlet at its lower end and a discharge opening above the inlet, so that liquid will flow through the tube in response to heat generated in the liquid at the lower end of the tube, and means including an element to restrict the flow of liquid into the tube when the liquid delivered from the tube reaches a predetermined temperature below the boiling point, whereby any liquid entering the tube will be immediately vaporized and heated liquid prevented from rising in the tube to overflow the discharge opening.

2. A thermal pump comprising an upstanding tube having an inlet at its lower end and a discharge opening above the inlet, so that liquid will flow through the tube in response to heat generated in the liquid at the lower end of the tube, and means including an element for substantially stopping the flow of liquid into the tube when the liquid at the inlet reaches a predetermined temperature below the boiling point whereby any liquid entering the tube will be immediately vaporized.

3. A thermal pump comprising an upstanding tube having an inlet at its lower end and a discharge opening above the inlet, so that liquid will flow through the tube in response to heat generated in the liquid at the lower end of the tube, a base for the pump and means carried by the base to restrict the flow of liquid into the tube when the liquid at the inlet reaches a predetermined temperature below the boiling point whereby any liquid entering the tube will be immediately vaporized.

4. A thermal pump comprising an upstanding tube having an inlet at its lower end and a discharge opening above the inlet, so that liquid will flow through the tube in response to heat generated in the liquid at the lower end of the tube, and means including an element for automatically substantially stopping the flow of liquid into the tube when the liquid at the inlet reaches a predetermined temperature below the boiling point whereby heated liquid thereafter is prevented from flowing upwardly through the tube to overflow at the discharge opening.

5. A thermal pump comprising an upstanding tube having an inlet at its lower end and a discharge opening above the inlet so that liquid will flow through the tube in response to heat generated in the liquid at the lower end of the tube, and a hollow base on the tube including an element automatically rendered operable when the liquid at the inlet reaches a predetermined temperature below the boiling point for substantially cutting off the flow of liquid to the tube so that any liquid entering the tube will be immediately vaporized.

6. A thermal pump comprising an upstanding tube having an inlet at its lower end and a discharge opening above the inlet, so that liquid will flow through the tube in response to heat generated in the liquid at the lower end of the tube and means including an element rendered operable when the liquid at the inlet reaches a predetermined temperature below the boiling point to substantially cut off the flow of liquid into the inlet.

7. In a liquid container, a coffee dripper above the normal liquid level of the container, a tubular thermal circulating pump having its inlet below the normal liquid level of the container and its outlet above the dripper and means including a pressure responsive element associated with the inlet to the pump to restrict the flow of liquid from the container into the pump when the liquid at the inlet to the pump reaches a predetermined temperature below the boiling point.

8. A thermal pump comprising an upstanding tube having an inlet at its lower end and a discharge above the inlet, and means for restricting the flow of liquid into the inlet when pressure within the tube reaches a predetermined value, said means including a pressure operated element to substantially close the inlet.

9. A thermal pump comprising an upstanding tube having an inlet at its lower end and a discharge above the inlet, and means for restricting the flow of liquid into the inlet when pressure within the tube reaches a predetermined value, said means including a pressure operated ball valve to substantially close the inlet.

10. A thermal pump comprising an upstanding tube having an inlet at its lower end and a discharge above the inlet, and means for restricting the flow of liquid into the inlet when pressure within the tube reaches a predetermined value, said means including a thermostatically operated element to substantially close the inlet.

11. A thermal pump comprising an upstanding tube having an inlet above its lower end and a discharge above the inlet, and means for restricting the flow of liquid into the inlet when the temperature at the inlet reaches a predetermined degree below the boiling point, said means including a thermally operated element to substantially close the inlet.

12. A thermal pump including an upstanding tube having an inlet at its lower end and a discharge opening above the inlet, a heater element associated with the lower end of the tube so that heated liquid will flow upwardly in the tube through the discharge opening in response to heat generated at the lower end of the tube and means associated with the inlet to the tube automatically operating in the presence of a predetermined pressure within the tube and a predetermined temperature condition externally of the tube for substantially closing the inlet.

13. A thermal pump including an upstanding tube having an inlet at its lower end and a discharge opening above the inlet, a heater element associated with the lower end of the tube so that heated liquid will flow upwardly in the tube and through the discharge opening in response to heat generated at the lower end of the tube and means associated with the inlet to the tube, including an element operable for substantially closing the inlet whereby liquid will be prevented from flowing upwardly through the tube to the discharge opening.

14. A thermal pump comprising an upstanding tube having an inlet at its lower end and a discharge opening above the inlet and means for substantially cutting off the flow of liquid into the inlet when the temperature of the liquid passing through the tube reaches a predetermined value below the boiling point.

15. A thermal pump including an upstanding tube having an inlet at its lower end and a discharge opening above the inlet, an electric heating element associated with the lower end of the tube so that heated liquid will flow upwardly in the tube through the discharge opening in response to heat generated at the lower end of the tube by the heater; the heat input and the pumping action being such that a definite time will be required to raise the temperature of the liquid surrounding the tube from its initial temperature to a higher temperature below the boiling point, and means including an element associated with the inlet to the tube automatically operable when the liquid passing through the tube reaches a predetermined temperature to cause substantial cessation of flow of liquid through the tube.

16. A thermal pump comprising an upstanding tube with an inlet at its lower end and an outlet above the inlet, a base for the tube having a passageway to admit liquid to the inlet, a receptacle having a liquid vapor generating well to receive the lower end of the tube, the receptacle having a normal liquid level above the base to provide a hydrostatic head and a valve at the inlet for substantially closing the passageway when the pressure generated in the passageway plus the normal seating pressure of the valve against its seat is sufficient to predominate over the pressure of the hydrostatic head in the receptacle.

AMBROSE D. OLDS.